United States Patent [19]

Hults

[11] 3,820,737
[45] June 28, 1974

[54] SPOOL HOLDER-LINE SERVER

[76] Inventor: Gerard V. Hults, 4508 W. Park Rd., Hollywood, Fla. 33021

[22] Filed: Sept. 5, 1972

[21] Appl. No.: 286,347

[52] U.S. Cl.................. 242/129.5, 74/515, 211/123
[51] Int. Cl......................... B65h 49/00, D01h 7/16
[58] Field of Search............ 242/55.3, 129.5–129.8; 225/46, 51, 52, 77, 78, 79; 74/515; 108/43; 211/123, 124; 248/251, 492; 220/17.1–17.3

[56] References Cited
UNITED STATES PATENTS

| 958,062 | 5/1910 | Adkins | 242/55.3 |
| 2,127,209 | 8/1938 | Duchan | 74/515 |
| 2,337,790 | 12/1943 | Williams | 242/129.6 |
| 2,594,605 | 4/1952 | Zoppelt | 211/123 |
| 2,974,806 | 3/1961 | Scewack | 211/123 |

Primary Examiner—Leonard D. Christian
Attorney, Agent, or Firm—Malin & Haley

[57] ABSTRACT

A spool holder-line server adapted to be held between the legs of a user which provides for the paying out of a line under tension to allow the free usage of the hand of a user while serving or transferring a line from the spool to a second spool or a reel. The holder consists of a shaft having resilient end means which may be held firmly between the legs of the user, a spool rotatably mounted near the center of the shaft, shaft collars placed adjacent to the spool on the shaft and a spring means adjacent to one side of the spool which would provide continuous drag on the rotational motion of the spool thereby tensioning the line as it is withdrawn.

1 Claim, 2 Drawing Figures

PATENTED JUN 28 1974 3,820,737

SPOOL HOLDER-LINE SERVER

BACKGROUND OF THE INVENTION

This invention relates generally to a spool holder-line server which provides for the transfer of line from a spool to a reel by one person. In the past it has been necessary to utilize two persons when winding or rewinding line from a spool of line to a fishing reel — one person to hold and wind the reel and the other to hold the spool.

Applicant's invention allows this operation to be accomplished by one person by freeing the hands of the user from the task of paying out the line under tension and allowing that person to manually rotate the reel to which the line is being transferred. The invention provides a spool holder with leg engagement means that is placed firmly between the legs of the user thereby freeing his hands for the reeling operation.

BRIEF DESCRIPTION OF THE INVENTION

A spool holder-line server adapted to be held firmly between the legs of the user comprising a shaft longitudinally sized to fit between the legs of a human being and adaptable for receiving a spool about its circumference, a pair of shaft collars to prevent movement of the spool along the longitudinal axis of the shaft, a means engageable with the spool to produce continuous drag on the rotational motion of the spool, and a means at each end of said shaft for resiliently engaging the leg area of a human being. In operation a spool is mounted about the shaft, the spool having a line desired to be transferred to a reel or another spool. A spring placed over one end of the shaft is engaged with the side of the spool. Shaft collars have been mounted, one on each side of the spool, one engaging with the spring, the other with the spool. Set screws in the shaft collars then hold the shaft collars firmly in place along the longitudinal axis of the shaft; this tensions the spring against the side of the spool itself. The device is then placed between the legs, preferably in the knee area of the user. His hands are then free to pay out the line or to wind in the line on a reel.

PREFERRED EMBODIMENT OF THE INVENTION

Figure 1:
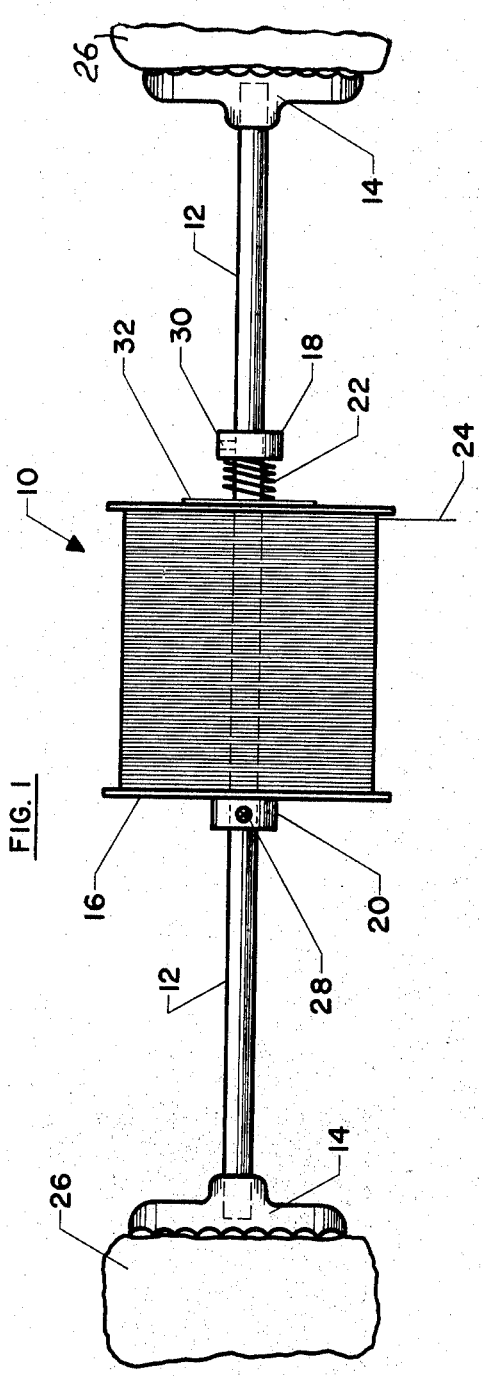
FIG. 1 is a front elevation of applicant's invention.

Referring now to the drawings, and especially to FIG. 1, applicant's spool holder-line server is shown generally at 10 comprising a rigid shaft 12 sized to fit between the legs of a human being having resilient means 14 which may be plastic caps engaged at each end of the shaft 12. A spool 16 is mounted approximately midway between the ends of the shaft 12, a spool holds a line 24 that is desired to be paid out. Shaft collars 18 and 20 are rigidly held along the shaft on each side of the spool 16 by set screws 30 and 28 respectively, thus preventing lateral movement of the spool along shaft 12. A spring 22 is engaged between one side of spool 16 and shaft collar 18 and is tensioned. A washer 32 is placed between spring 22 and spool 16. Spring 22 provides a resilient drag rotationally on spool 16, thus when line is paid out of the spool, the line is tensioned due to the drag on the spool.

Because the shaft collars may be moved laterally along the shaft longitudinal axis when the set screws are loosened, spools of variable width may be used with applicant's invention.

In operation shaft 12 and the end portions thereof 14 are engaged between the user's legs shown at 26 and are held in place during the paying out operation.

The shaft may be made of any suitable material such as aluminum, while the resilient ends are preferably plastic or rubber. Although the drag means has been shown as a spring tensioning the spool, any other equivalent can be substituted to provide continuous tension against the spool as line is served out with tension to reel.

Figure 2:
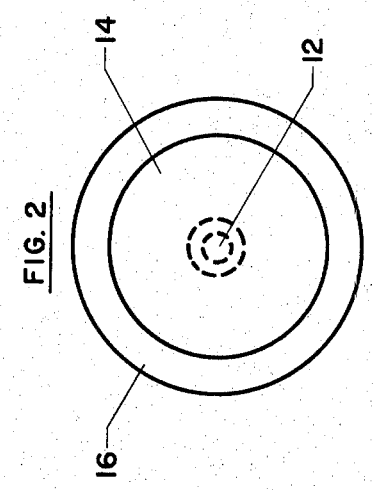
FIG. 2 is a side elevation of applicant's invention.

FIG. 2 shows a side view of applicant's device having reel 16 and an end portion which is resilient cap 14.

The instant invention has been shown and described herein in what is considered to be the most practical and preferred embodiment. It is recognized, however, that departures may be made therefrom within the scope of the invention and that obvious modifications will occur to a person skilled in the art.

What I claim is:
1. A spool holder comprising:
 a rigid shaft;
 a cushioning tip disposed at each end of said shaft,
 a spool mounted rotatably about the midsection of said shaft;
 a line wound about said spool;
 a first shaft collar mounted said shaft adjacent one side of said spool;
 a first set screw moveably mounted to said shaft collar and engageable with said shaft to prevent longitudinal motion of said shaft collar along said shaft;

a spring tensionably mounted between said shaft collar and one side of said spool;
 a second shaft collar mounted on said shaft adjacent to the opposite side of said spool; and
 a second set screw movably mounted within said shaft collar and engageable with said shaft surface to prevent lateral motion to said shaft collar along the longitudinal axis of said shaft.

* * * * *